Figure 1:
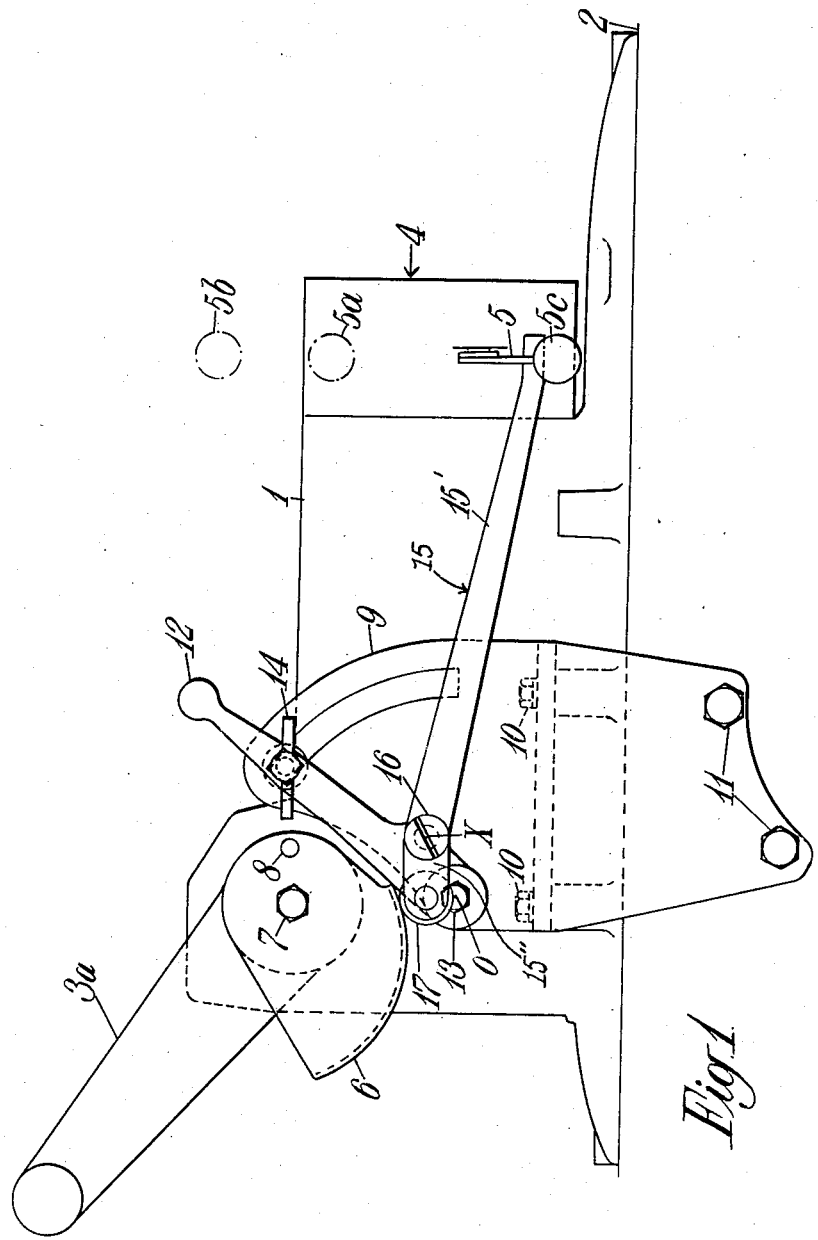

May 6, 1958

F. W. PITNEY 2,833,195

TRACTOR HYDRAULIC LIFTS

Filed June 27, 1955

2 Sheets-Sheet 1

Inventor
F. W. Pitney
By Glascock Downing Hubbell
Attys

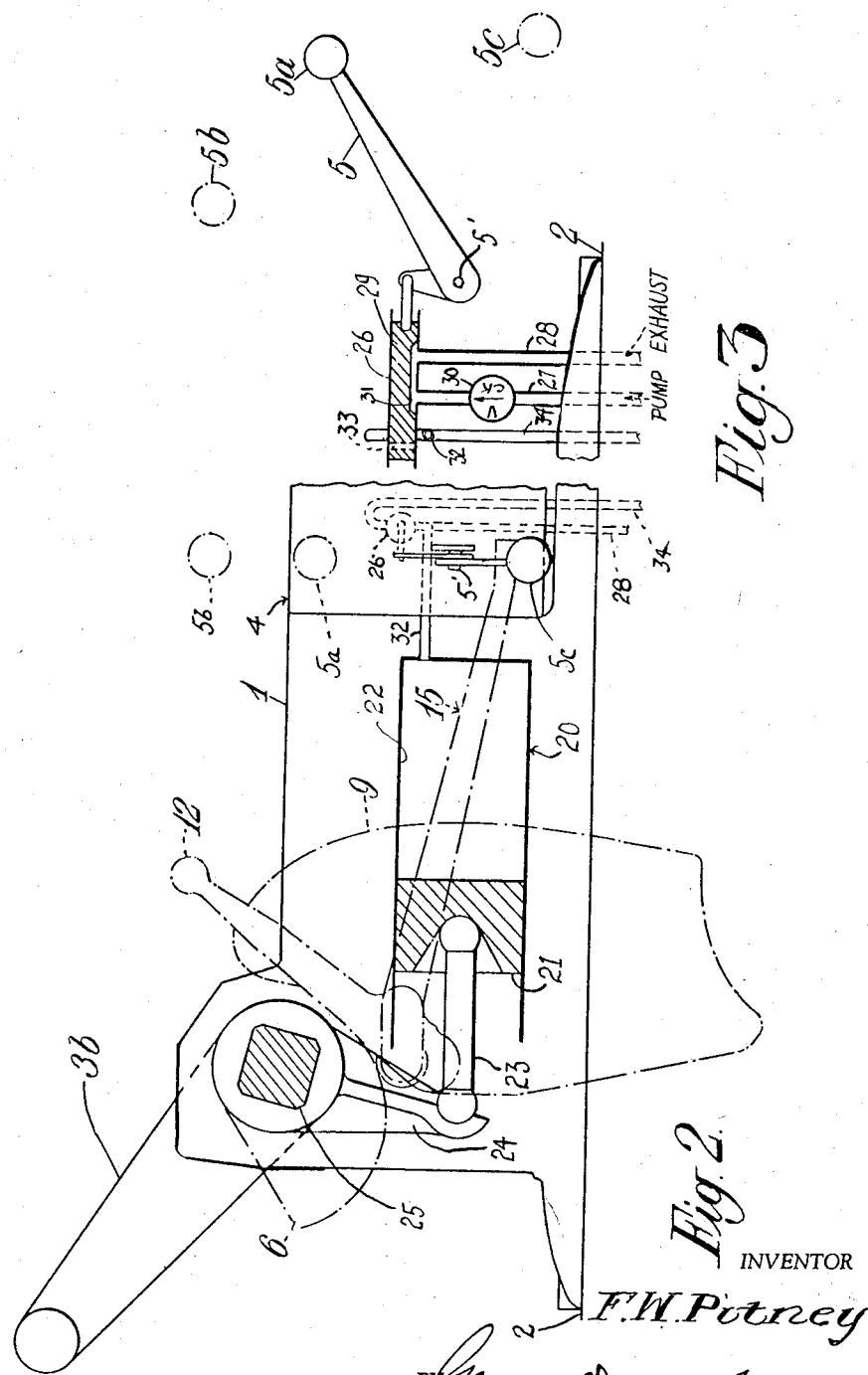

United States Patent Office 2,833,195
Patented May 6, 1958

2,833,195

TRACTOR HYDRAULIC LIFTS

Frank William Pitney, Ilford, England, assignor to Ford Motor Company Limited, London, England Application June 27, 1955, Serial No. 518,224

Claims priority, application Great Britain July 2, 1954

1 Claim. (Cl. 97—46.59)

This invention relates to tractor hydraulic lifts.

For connecting an agricultural implement to a tractor it is customary to employ three links namely two lower links on the same level and spaced apart laterally and a third top link laterally spaced intermediate the lower links.

The lower links are adapted to be raised and lowered by means of links pivotally mounted at their lower ends intermediate the lower links and at their top ends pivotally secured to the ends of lift arms which are hydraulically actuated, for example, by means of a hydraulic ram or motor.

In one form of tractor hydraulic lift the lift arms are adapted to be controlled in position from a manually-operable, valve control gear, the control level of which has three positions, namely an upper position which causes the lift arms to rise, a lower position which causes them to fall, and an intermediate position.

When the control lever is moved from the upper or lower position to the intermediate position the lift arms are arrested in the position which they have reached.

In operation the lift arms will be raised or lowered responsive to actuation of the control lever to the desired height for attachment of the implement. The control lever will then be placed in its lowermost position leaving the lift arms free to rise or fall with the implement.

Control of the lowermost depth of operation of the implement is then generally effected by means of a depth wheel on the implement.

It is an object of the invention to control the lowermost depth of operation of an implement by means of the hydraulic lift.

The invention consists of a tractor hydraulic lift of the kind described in which means are provided for arresting the fall of the lift arms at an adjustable, predetermined point corresponding to a desired depth of operation of the implement.

Preferably the fall is arrested by cutting off the exhaust of liquid from the cylinder of the hydraulic ram.

Further and more specific objects will be apparent from the accompanying drawings in which:

Figure 1 is a fragmentary side elevation illustrating the invention as applied to a tractor, Figure 2 is a similar view partly in section, partly broken away and diagrammatically illustrating the hydraulic ram or motor for actuating the lift arms and Figure 3 is a fragmentary diagrammatic view displaced 90° to the right of Figure 2 and illustrating the valve control for the hydraulic ram or motor shown in Figure 2.

The usual hydraulic lifting ram or motor 20 is housed within body 1 mounted on the tractor rear transmission housing 2. The ram piston 21, slidable in cylinder 22 has its piston rod 23, via lever 24 coupled to shaft 25 which carries two lift arms 3a, Figure 1 and 3b, Figure 2. A pump, not shown for delivering pressure fluid to the ram cylinder 22 is suitably located and driven by the tractor engine—either directly or through the medium of the tractor transmission.

Body 1 has bolted to it a valve control gear arrangement shown diagrammatically at 4. The valve control gear arrangement includes a valve casing 26 to which oil is delivered and returned through suitable pipes or conduits 27 and 28 in communication with the pump and a reservoir respectively. The valve control gear governs the flow of pressure fluid to the ram cylinder 22 under the control of a manual control lever 5, which is directly connected to the main valve body 29 that is slidable in valve casing 26 of the valve control gear.

When control lever 5 is pivoted about axis 5' and placed in the neutral position 5a, valve body 29 is in the intermediate position in valve casing 26, as shown in Figure 3 and oil from the pump is allowed by the valve body to flow back into the main oil reservoir, not shown. In this case the rear transmission housing 2. Therefore, oil does not enter the ram cylinder 22 and the position of the piston 21 is not influenced thereby.

When the control lever 5 is raised from the intermediate position toward and to raised or upper position 5b, the valve body 29 is moved to the left, Figure 3, and oil from the pump flows past a non-return or check valve 30, and through the relieved or port portion 31 of the valve body which places the inlet pipe 27 in communication with a pipe or conduit 32 that is in communication with the ram cylinder. This will cause the ram piston to move rearwardly, that is, to the left in Figure 2 so as to turn shaft 25 and hence raise the arms 3a and 3b. When the piston reaches the end of its stroke a cut-off device, not shown, causes delivery of oil to the ram cylinder to be discontinued and the oil is by-passed back into the housing 2. Oil is prevented from leaving the ram cylinder and arms 3a and 3b are maintained in the raised position. Lever 5 can be returned to the neutral position 5a at any point throughout the lifting operation and, therefore, allow arms 3a and 3b to be maintained at any position desired.

To lower arms 3a and 3b, lever 5 is placed in the lowered position 5c, and the valve body 29 is moved to the right to place a discharge port 33 through the valve body in communication with pipe or conduit 32 and an exhaust pipe 34 so as to allow oil to be exhausted from the ram cylinder back into the housing 2. As in the case of the lifting cycle, arms 3a and 3b can be arrested by any position throughout the operation by returning lever 5 back to the neutral position 5a.

A cam 6 is attached to the outside of lift arm 3a by a set screw 7 and located in its appropriate position by a dowel pin 8. A quadrant 9 is fixed to the side of the tractor by two bolts 10 and two bolts 11. Lever or radius arm 12 is pivotally attached to quadrant 9 at point O and may be frictionally pre-loaded by a friction pad (not shown) secured between lever 12 and quadrant 9 and a compression spring (not shown) attached to bolt 13 by a washer and nut on the inner side of the quadrant 9.

A hand screw 14 and nut are provided for securing lever 12 to quadrant 9 in any adjusted position permitted by the slot in quadrant 9. A rocker arm or lever 15 is pivotally attached or mounted intermediate its length at point X to lever 12 by a pivot 16 so as to provide a long lever arm portion 15', and a short lever arm portion 15". Roller 17, fitted at the rear end or short lever arm portion 15" of rocker arm 15, contacts cam 6 and the outer part of long lever arm portion 15' of rocker arm 15 is so disposed as to engage the underside of control lever 5. Downward movement of lever 12 on quadrant 9 will move roller 17 out of initial contact with cam 6.

When lever 5 is placed into the lowered position 5c, arms 3a and 3b will fall until cam 6 contacts roller 17. Rocker arm 15 will then pivot at point X and return lever 5 to the neutral position 5a thereby arresting further movement of lift arms 3a and 3b.

The arrangement of the invention may be used in conjunction with a telescopic top link between tractor and implement whereby the effect of slight ground irregularities, raising the rear wheels of the tractor or lowering the front wheels, can be offset.

The top link of the three point linkage described could also be of the type described in British Patent No. 622,166, but suitably modified to provide the telescopic action referred to above.

Various modifications may be made within the scope of the invention.

What I claim is:

A tractor hydraulic lift comprising a body member, a pair of lift arms pivotally mounted on the body member, a hydraulic ram for operating the lift arms, valve control gear mounted on the body member for controlling said ram, a manual control lever for operating the valve control gear and having a lower position in which the ram is operated by the valve control gear so that the lift arms are lowered and a higher position in which the ram is operated by the valve control gear so that the lowering of the lift arms is arrested, a quadrant secured to the body member, a radius arm pivotally attached to the quadrant, means for securing the radius arm to the quadrant in any of a range of positions, a second lever pivotally mounted intermediate its length on the radius arm so as to have a long lever arm portion and a short lever arm portion, said long lever arm portion being disposed under the manual control lever in the lower position of said control lever and a cam attached to the outside of one of the lift arms to rotate therewith and acting on the other end of the second lever over the short lever arm portion when the lift arms are lowered to a predetermined position, dependent on the position of the radius arm, to move the manual control lever to its higher position.

References Cited in the file of this patent

UNITED STATES PATENTS

| | | |
|---|---|---|
| 2,631,515 | McRae | Mar. 17, 1953 |
| 2,700,330 | Starr | Jan. 25, 1955 |
| 2,721,508 | Edman | Oct. 25, 1955 |